United States Patent
Kitawaki et al.

(10) Patent No.: US 12,555,602 B2
(45) Date of Patent: Feb. 17, 2026

(54) MAGNETIC DISK SUBSTRATE AND MAGNETIC DISK USING MAGNETIC DISK SUBSTRATE

(71) Applicants: UACJ CORPORATION, Tokyo (JP); FURUKAWA ELECTRIC CO., LTD., Tokyo (JP)

(72) Inventors: Kotaro Kitawaki, Tokyo (JP); Hideyuki Hatakeyama, Tokyo (JP); Wataru Kumagai, Tokyo (JP); Ryo Sakamoto, Tokyo (JP)

(73) Assignees: UACJ CORPORATION, Tokyo (JP); FURUKAWA ELECTRIC CO., LTD., Tokyo (JP)

( * ) Notice: Subject to any disclaimer, the term of this patent is extended or adjusted under 35 U.S.C. 154(b) by 151 days.

(21) Appl. No.: 18/002,695

(22) PCT Filed: Jun. 30, 2021

(86) PCT No.: PCT/JP2021/024858
§ 371 (c)(1),
(2) Date: Dec. 21, 2022

(87) PCT Pub. No.: WO2022/004826
PCT Pub. Date: Jan. 6, 2022

(65) Prior Publication Data
US 2023/0238027 A1  Jul. 27, 2023

(30) Foreign Application Priority Data
Jul. 3, 2020 (JP) .................. 2020-115353

(51) Int. Cl.
*G11B 5/73* (2006.01)
*B32B 15/20* (2006.01)
(Continued)

(52) U.S. Cl.
CPC .......... *G11B 5/73921* (2019.05); *B32B 15/20* (2013.01); *B32B 17/061* (2013.01);
(Continued)

(58) Field of Classification Search
CPC ... G11B 5/73919; G11B 5/73921; G11B 5/66; G11B 5/82; B32B 15/20; B32B 17/061; B32B 2307/7375; B32B 2307/208
See application file for complete search history.

(56) References Cited

U.S. PATENT DOCUMENTS

2001/0044038 A1  11/2001  Morita
2002/0025408 A1  2/2002  Davis
(Continued)

FOREIGN PATENT DOCUMENTS

JP    11345412 A    12/1999
JP    2001344742 A  12/2001
(Continued)

OTHER PUBLICATIONS

English machine translation of JP11-345412 (Year: 1999).*
(Continued)

*Primary Examiner* — Holly Rickman
(74) *Attorney, Agent, or Firm* — Greer, Burns & Crain, Ltd.

(57) ABSTRACT

A magnetic disk substrate includes an aluminum alloy including one type or two or more types of Fe: 8.5 mass % or less, Mn: 2.5 mass % or less, Ni: 6.5 mass % or less, and Mg: 4.5 mass % or less, a balance being Al and unavoidable impurities, wherein, when f (Hz) is a resonance frequency, ρ (g/cm³) is a density, and t (mm) is a plate thickness, (f×ρ/t) is 3800 or greater; and a magnetic disk using the magnetic disk substrate.

22 Claims, 3 Drawing Sheets

(51) Int. Cl.
    *B32B 17/06*    (2006.01)
    *G11B 5/82*    (2006.01)

(52) U.S. Cl.
    CPC .......... *G11B 5/82* (2013.01); *B32B 2307/208* (2013.01); *B32B 2307/7375* (2023.05)

(56) References Cited

U.S. PATENT DOCUMENTS

| | | |
|---|---|---|
| 2002/0048691 A1 | 4/2002 | Gorczyca et al. |
| 2002/0080712 A1 | 6/2002 | Feist et al. |
| 2002/0094455 A1 | 7/2002 | Feist et al. |
| 2002/0115550 A1 | 8/2002 | Kawai et al. |
| 2005/0233151 A1 | 10/2005 | Feist et al. |
| 2008/0201937 A1 | 8/2008 | Feist et al. |
| 2017/0327930 A1 | 11/2017 | Kitawaki et al. |
| 2020/0027481 A1 | 1/2020 | Osakabe |

FOREIGN PATENT DOCUMENTS

| | | | | |
|---|---|---|---|---|
| JP | 2002145640 A | 5/2002 | | |
| JP | 2002536778 A | 10/2002 | | |
| JP | 6467118 B1 | 2/2019 | | |
| WO | 2016068293 A1 | 5/2016 | | |
| WO | WO-2017175682 A1 * | 10/2017 | ............... | B32B 1/00 |
| WO | 2018225725 A1 | 12/2018 | | |
| WO | WO-2020032146 A1 * | 2/2020 | ............... | B24B 1/00 |

OTHER PUBLICATIONS

English machine translation of WO2017/175682 (Year: 2017).*
English machine translation of WO2019/004484 (Year: 2019).*
English machine translation of WO 2020/032146 (Year: 2020).*
English translation of JP2001-344742 (Year: 2001).*
JP 6-145927 (Year: 1994), English translation, pp. 1-15.*
ISR issued in PCT/JP2021/024858, mailed Sep. 28, 2021.
Office Action issued in corresponding Japanese patent application No. 2020-115353, dated Jun. 3, 2021.
Written Opinion issued in PCT/JP2021/024858, mailed Sep. 28, 2021.

* cited by examiner

MAGNETIC DISK SUBSTRATE AND MAGNETIC DISK USING MAGNETIC DISK SUBSTRATE

TECHNICAL FIELD

The present disclosure relates to a magnetic disk substrate that has excellent impact resistance and energy conservation, and a magnetic disk using the magnetic disk substrate.

BACKGROUND ART

Magnetic disks used in storage devices of computers are manufactured using magnetic disk substrates that have good plating properties and, also, excellent mechanical properties and workability. Such magnetic disk substrates are manufactured from an aluminum alloy-based aluminum alloy substrate, a glass-based glass substrate, or the like. A known example of such an aluminum alloy substrate is an aluminum alloy substrate formed from JIS5086 aluminum alloy (Mg: 3.5 to 4.5 mass %, Fe: 0.50 mass % or less, Si: 0.40 mass % or less, Mn: 0.20 to 0.70 mass %, Cr: 0.05 to 0.25 mass %, Cu: 0.10 mass % or less, Ti: 0.15 mass % or less, Zn: 0.25 mass % or less, balance: Al and unavoidable impurities).

In the manufacturing of a typical magnetic disk, firstly, an annular magnetic disk substrate is fabricated, and a magnetic body is adhered to the surface of the magnetic disk substrate. For example, a magnetic disk using an aluminum alloy magnetic disk substrate formed from the JIS5086 aluminum alloy described above is manufactured in accordance with the following manufacturing process.

Firstly, an aluminum alloy material having a predetermined chemical composition is cast, and the resulting ingot is hot rolled and then cold rolled to fabricate rolled stock having a thickness required for the magnetic disk. It is preferable that this rolled stock is, as necessary, subjected to annealing during the cold rolling or the like. Next, the rolled stock is punched in an annular shape to obtain annular aluminum alloy plates. Then, in order to eliminate distortions and the like caused by the manufacturing processes carried out so far, the annular aluminum alloy plates are stacked, and pressure-annealing is performed in which the plates are annealed while applying pressure from both the top and bottom surfaces to flatten the plates. Thus, annular aluminum alloy disk blanks are fabricated.

The aluminum alloy disk blanks fabricated in this manner are, as preprocessing, subjected to cutting, grinding, degreasing, etching, and a zincate treatment (Zn replacement treatment). Next, Ni—P, which is a hard nonmagnetic metal, is electroless-plated as a base layer treatment, and the plating surface is polished. As a result, a magnetic disk aluminum alloy substrate is manufactured.

Then, a magnetic body is sputtered on the magnetic disk aluminum alloy substrate manufactured in this manner and, as a result, an aluminum alloy magnetic disk is manufactured.

Note that, in addition to aluminum alloy substrates, glass substrates and the like are also used as magnetic disk substrates.

However, in recent years, due to the needs of multimedia and the like, demands have increased for magnetic disk devices such as hard disk drives (HDD) that have higher volumes and higher densities. To achieve such higher volumes, there is an increasing trend in the number of magnetic disks mounted in a storage device, and thinner magnetic disks are needed to enable such configurations.

However, there is a problem in that rigidity decreases when the magnetic disk substrate is made thinner. When rigidity decreases, impact resistance, which indicates the degree of resistance to deformation of the substrate, decreases and, as such, enhancement of the impact resistance of the substrate is needed. Additionally, when the number of substrates is increased, power consumption when used as a magnetic disk device increases excessively and, as such, energy conservation is needed.

In light of this situation, in recent years, there has been a strong desire for, and studies have been performed related to, magnetic disk substrates having high rigidity. For example, Patent Literature 1 proposes a method for enhancing rigidity by compounding a large amount of an Si component, which contributes to rigidity enhancements of an aluminum alloy substrate.

CITATION LIST

Patent Literature

Patent Literature 1: International Publication No. WO 2016/068293

SUMMARY OF INVENTION

Technical Problem

However, in the method described in Patent Literature 1 in which the Si content is increased to enhance only the rigidity, it is not possible to significantly suppress decrees of the impact resistance, and excellent impact resistance, which is the goal, cannot be obtained.

The present disclosure is made with the view of the above situation, and an objective of the present disclosure is to provide a magnetic disk substrate that has excellent impact resistance and energy conservation, and a magnetic disk using the magnetic disk substrate.

Solution to Problem

The present inventors diligently studied, for magnetic disk substrates, the relationship between impact resistance and energy conservation, and the various characteristics of the substrate and, as a result, discovered that the relationship between the resonance frequency (f), the density ($\rho$), and the plate thickness (t) of the substrate, and the weight of the substrate significantly affect impact resistance and energy conservation. Moreover, the present inventors discovered that impact resistance is enhanced and excellent energy conservation is obtained in a substrate in which the relationship between the resonance frequency (f), the density ($\rho$), and the plate thickness (t), and the weight are in predetermined ranges. The present inventors completed the present disclosure on the basis of these findings.

A first aspect according to the present disclosure is a magnetic disk substrate comprising an aluminum alloy including one type or two or more types of Fe: 8.5 mass % or less, Mn: 2.5 mass % or less, Ni: 6.5 mass % or less, and Mg: 4.5 mass % or less, a balance being Al and unavoidable impurities, wherein, when f (Hz) is a resonance frequency, $\rho$ (g/cm$^3$) is a density, and t (mm) is a plate thickness, (f×$\rho$/t) is 3800 or greater.

In the first aspect, the aluminum alloy may further include one type or two or more types of Zn: 0.7 mass % or less, Cu: 1.0 mass % or less, Cr: 0.30 mass % or less, Zr: 0.20 mass % or less, Be: 0.0015 mass % or less, Sr: 0.1 mass % or less, Na: 0.1 mass % or less, and P: 0.1 mass % or less.

A second aspect according to the present disclosure is a magnetic disk substrate comprising a glass material including $SiO_2$: 55 to 75 mass % as a main component and to which $Al_2O_3$: 0.3 to 25 mass % and CaO: 0 to 20 mass % are added, wherein when f (Hz) is a resonance frequency, $\rho$ ($g/cm^3$) is a density, and t (mm) is a plate thickness, (f×$\rho$/t) is 3800 or greater.

In the second aspect, the glass material may further include one type or two or more types of $Li_2O$: 0.01 to 6 mass %, $Na_2O$: 0.7 to 12 mass %, $K_2O$: 0 to 8 mass %, MgO: 0 to 7 mass %, $ZrO_2$: 0 to 10 mass %, and $TiO_2$: 0 to 1 mass %.

Furthermore, in the second aspect, the glass material may further include one type or two or more types of $B_2O_3$, SrO, BaO, ZnO, $SnO_2$, $Fe_2O_3$, $As_2O_3$, and $Sb_2O_3$, respectively at 15% or less.

In the aspects described above, the (f×$\rho$/t) may be 4000 or greater.

In the aspects described above, the (f×$\rho$/t) may be 4200 or greater.

In the aspects described above, a weight per one magnetic disk may be from 6.0 to 11.0 g.

In the aspects described above, a weight per one magnetic disk may be from 6.0 to 10.5 g.

In the aspects described above, a weight per one magnetic disk may be from 6.0 to 8.7 g.

Another aspect of the present disclosure is a magnetic disk comprising a magnetic body layer on a surface of the magnetic disk substrate according to any of the aspects described above.

Advantageous Effects of Invention

According to the present disclosure, a magnetic disk substrate that has excellent impact resistance and energy conservation, and a magnetic disk using this magnetic disk substrate can be provided.

DESCRIPTION OF EMBODIMENTS

The present disclosure relates to a magnetic disk substrate (hereinafter, the magnetic disk substrate is sometimes referred to simply as "substrate"), and further relates to a magnetic disk in which a magnetic body layer is provided on a surface of the magnetic disk substrate. These are described in detail below.

1. Magnetic Disk Substrate

In a magnetic disk substrate according to the present disclosure, when f (Hz) is a resonance frequency, $\rho$ ($g/cm^3$) is a density, and t (mm) is a plate thickness, excellent impact resistance can be obtained by defining (f×$\rho$/t) to be 3800 or greater.

Furthermore, the impact resistance can be enhanced further and enhancements of energy conservation can be obtained by defining a weight of the magnetic disk substrate per one magnetic disk to be from 6.0 to 11.0 g. Note that the unit of the (f×$\rho$/t) is [(Hz)·($g/cm^3$)·($mm^{-1}$)].

1-1. (f×$\rho$/t)

According to the investigations by the present inventors, an effect of enhancing the impact resistance of a substrate is exhibited by increasing the (f×$\rho$/t) of the substrate. The substrate vibrates when the magnetic disk device is dropped or the like, and the frequency at that time varies depending on the acceleration and the like when dropped, and is about from 500 to 1500 Hz. Resonance is less likely to occur due to the f of the substrate being high and, due to this, deformation of the substrate is suppressed and decreases of the impact resistance can be suppressed. Resonance is more likely to occur in substrates in which the f is low, even when the force applied when the magnetic disk device is dropped or the like is small and, consequently, deformation of the substrate increases and the impact resistance in impacts with other members and the like decreases. Note that, since the value of f varies depending on t, a value obtained by dividing f by t is used for normalization.

Figure 3:
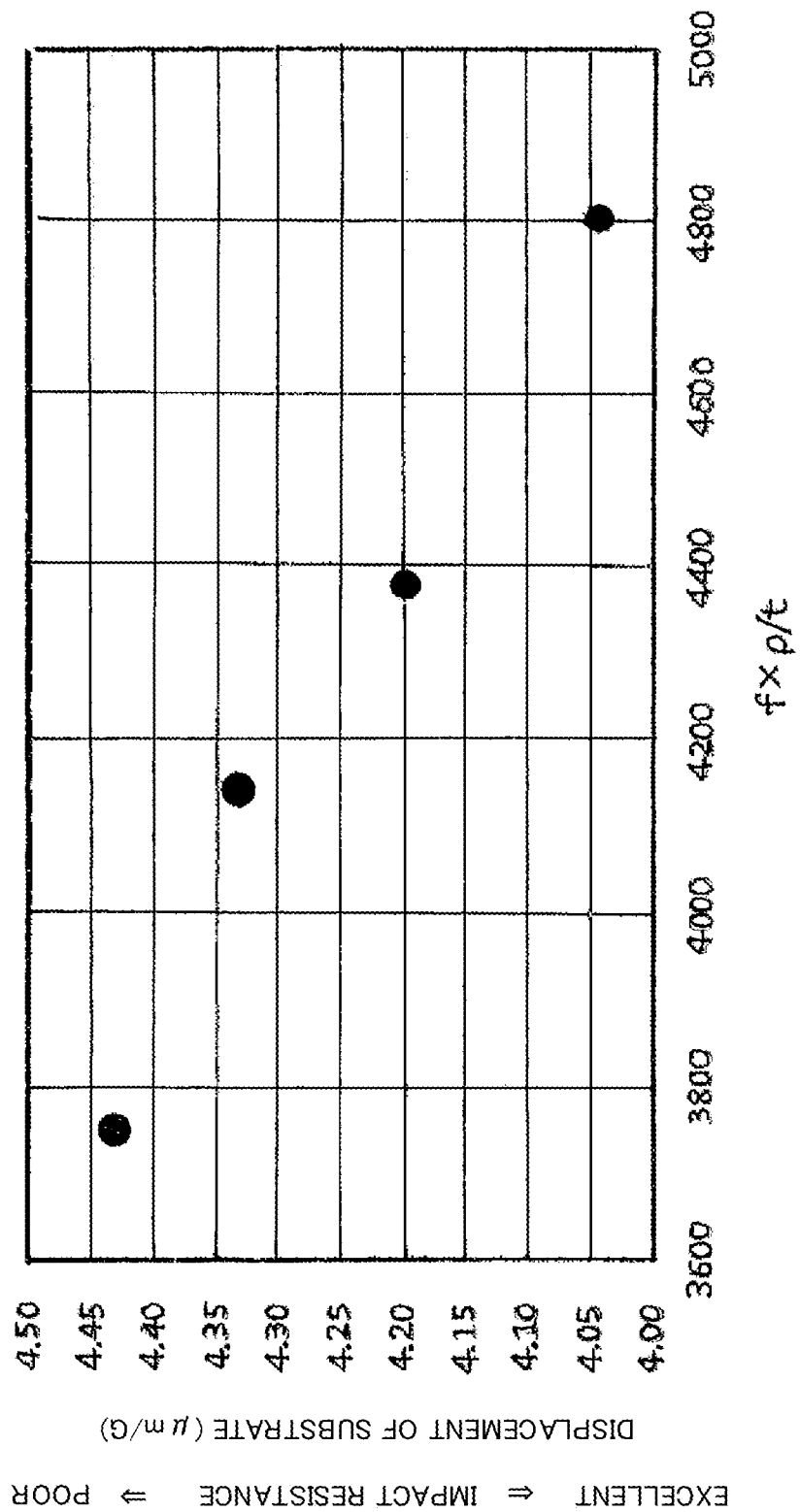
FIG. 3 illustrates a graph illustrating the relationship between (f×$\rho$/t) and impact resistance.

Conventionally it has been accepted that a lower $\rho$ leads to excellent impact resistance. FIG. 3 is a graph illustrating the relationship, discovered by the present inventors, between the (f×$\rho$/t) and the impact resistance. At the four plotted points, the t and the f are substantially the same, and the $\rho$ is varied greatly. The vertical axis in the drawing is displacement/acceleration calculated from acceleration and displacement ($\mu$m) data (12 points) obtained by changing the height so that an acceleration (G) at a time of dropping impact is from 30 to 50 G and an acting time is 2 msec, naturally dropping the substrate in the vertical direction at an initial velocity of 0 m/s, and measuring substrate deflection (displacement) at the outer circumference when impacting the ground. Note that, in the testing, the inner circumference of the substrate was fixed to a block and, in this state, the block impacted the ground.

From FIG. 3, it is clear that displacement decreases as the (f×$\rho$/t) increases, that is, as the $\rho$ increases. Substrates for which $\rho$ is low are more susceptible to buoyancy and have longer vibration times and, as such, are more likely to be displaced. In cases in which a magnetic disk device in which a magnetic disk is mounted is dropped or the like, in a magnetic disk using a substrate for which displacement is great illustrated in FIG. 3, the number of impacts with other members (other magnetic disks, the ramp road where the head is sheltered, and the like) increases, and damage due to scratching and the like increases. In the present disclosure, the characteristic whereby such damage is resisted is referred to as impact resistance. The (f×$\rho$/t) of the substrate must be defined to be 3800 or greater in order to avoid decreases of the impact resistance. The (f×$\rho$/t) preferably is 4000 or greater and more preferably is 4200 or greater. Note that, while an upper limit of the (f×$\rho$/t) of the substrate is not particularly limited, the upper limit is naturally determined on the basis of the material and composition of the substrate and the manufacturing conditions. In the present disclosure, it is preferable that the upper limit is set to about 5500.

1-2. Weight

In the present disclosure, in order to enhance the impact resistance, a weight of the magnetic disk substrate per one magnetic disk is important, and it is preferable that this weight is from 6.0 to 11.0 g. Due to this, the impact resistance can be further enhanced. The impact resistance of the substrate is enhanced by avoiding impacts of the substrate with other members when a force is applied to the substrate when the magnetic disk is dropped or the like and vibration is generated. As the weight of the substrate increases, the amount of time required for the vibration of the substrate to converge shortens and, as such, opportunities for contact with the other members decrease and impact resistance such as scratching due to contact and the like is suppressed. However, when the weight of the substrate is excessively heavy, the power consumption when using the magnetic disk increases excessively, and energy conservation is lacking. Specifically, energy conservation is lacking due to an increase in the power consumption of a spindle motor that is used to rotate the magnetic disk. Power consumption is related to driving force, and can be expressed as the product of rotation speed (rpm), torque (N·m), and a coefficient. When the substrate weight increases, the torque increases and, as a result, the driving force increases, thus leading to an increase in power consumption.

The present inventors discovered that the impact resistance and the energy conservation are excellent when the weight of the magnetic disk substrate per one magnetic disk is from 6.0 to 11.0 g. When the weight is less than 6.0 g, the effect of suppressing the impact resistance cannot be sufficiently obtained and, when the weight exceeds 11.0 g, power consumption increases excessively and energy conservation is lacking. In the present disclosure, the weight preferably is set to 6.00 to 11.0 g, more preferably is set to 6.0 to 10.5 g, and even more preferably is set to 6.0 to 8.7 g.

1-3. Material

A metal material such as aluminum alloy can be used as the material of the magnetic disk substrate according to the present disclosure. Additionally, a glass material can be used as the material. In the following, a magnetic disk substrate constituted from an aluminum alloy (hereinafter referred to as "magnetic disk aluminum alloy substrate") and a magnetic disk substrate constituted from a glass material (hereinafter referred to as "magnetic disk glass substrate") are described.

1-3-1. Magnetic Disk Aluminum Alloy Substrate

The magnetic disk substrate according to the present disclosure can be constituted from an aluminum alloy. In the following, an alloy composition and a manufacturing method of the magnetic disk aluminum alloy substrate according to the present disclosure are each described in detail.

(a) Alloy Composition

It is preferable that the aluminum alloy used in the magnetic disk aluminum alloy substrate according to the present disclosure contains elements such as Fe, Mn, Ni, Mg, and the like that can enhance the resonance frequency and the density.

Specifically, the aluminum alloy contains one type or two or more types of Fe: 8.5 mass % (hereinafter referred to as simply "%") or less, Mn: 2.5% or less, Ni: 6.5% or less, and Mg: 4.5% or less, and the balance is Al and unavoidable impurities. The aluminum alloy may further contain one type or two or more types of Zn: 0.7% or less, Cu: 1.0% or less, Cr: 0.30% or less, Zr: 0.20% or less, Be: 0.0015% or less, Sr: 0.1% or less, Na: 0.1% or less, and P: 0.1% or less.

Fe:

Fe exists mainly as second-phase particles (Al—Fe intermetallic compounds, and the like) and partly in a solid solution in matrix, and exhibits an effect of increasing the f and the $\rho$ of the aluminum alloy substrate. By increasing the solid solution Fe amount, a favorable f can be obtained due to interaction between the solid solution Fe and the Al. Additionally, since Fe has a higher $\rho$ than Al, the $\rho$ increases when the Fe content increases. The effect of increasing the f and the $\rho$ of the aluminum alloy substrate can be further enhanced due to the Fe content in the aluminum alloy being 8.5% or less. Additionally, significant increases in the substrate weight can be suppressed. As a result, a substrate having excellent impact resistance and energy conservation can be obtained. As such, the Fe content in the aluminum alloy is preferably in a range of 8.5% or less, and more preferably is 1.8% or less. A lower limit preferably is set to 0.1% and more preferably is set to 0.2%.

Mn:

Mn exists mainly as second-phase particles (Al—Mn intermetallic compounds, and the like) and partly in a solid solution in matrix, and exhibits an effect of increasing the f and the $\rho$ of the aluminum alloy substrate. By increasing the solid solution Mn amount, a favorable f can be obtained due to interaction between the solid solution Mn and the Al. Additionally, since Mn has a higher $\rho$ than Al, the $\rho$ increases when the Mn content increases. The effect of increasing the f and the $\rho$ of the aluminum alloy substrate can be further enhanced due to the Mn content in the aluminum alloy being 2.5% or less. Additionally, significant increases in the substrate weight can be suppressed. As a result, a substrate having excellent impact resistance and energy conservation can be obtained. As such, the Mn content in the aluminum alloy is preferably in a range of 2.5% or less, and more preferably is 1.8% or less. A lower limit preferably is set to 0.1% and more preferably is set to 0.2%.

Ni:

Ni exists mainly as second-phase particles (Al—Ni intermetallic compounds, and the like) and partly in a solid solution in the matrix, and exhibits an effect of increasing the f and the $\rho$ of the aluminum alloy substrate. By increasing the solid solution Ni amount, a favorable f can be obtained due to interaction between the solid solution Ni and the Al. Additionally, since Ni has a higher $\rho$ than Al, the $\rho$ increases when the Ni content increases. The effect of increasing the f and the $\rho$ of the aluminum alloy substrate can be further enhanced due to the Ni content in the aluminum alloy being 6.5% or less. Additionally, significant increases in the substrate weight can be suppressed. As a result, a substrate having excellent impact resistance and energy conservation can be obtained. As such, the Ni content in the aluminum alloy is preferably in a range of 6.5% or less, and more preferably is 5.5% or less. A lower limit preferably is set to 0.1% and more preferably is set to 0.2%.

Mg:

Mg exists mainly in a solid solution in matrix and partly as second-phase particles (Mg—Si intermetallic compounds, and the like). Since Mg has a lower $\rho$ than Al, the weight of the substrate decreases when the Mg content increases, thereby exhibiting an effect from the perspective of energy conservation. However, when the Mg content exceeds 4.5%, f decreases due to the interaction between the solid solution Mg and the Al. As such, the Mg content in the aluminum alloy preferably is 4.5% or less, more preferably is 2.5% or less, and even more preferably is 1.0% or less. A lower limit preferably is set to 0.1% and more preferably is set to 0.2%.

Zn, Cu, Cr, Zr, Be, Sr, Na, and P:

By adding each of these various elements in the content ranges described above, these elements will exist as intermetallic compounds or the like or as solid solutions in matrix, and exhibit the effect of increasing the f and the $\rho$ of the aluminum alloy substrate. Additionally, by increasing the solid solution amounts, a favorable f can be obtained due to the interaction between the solid solution elements and the Al.

Other Elements Such as Unavoidable Impurities

Other than the essential components and optional components described above, the aluminum alloy may include elements that become unavoidable impurities. Examples of these elements include Si, Ti, V, Ga, and the like, and the effects of the present disclosure are not inhibited provided that the content of each element is 0.10% or less, and a total content of these elements is 0.30% or less.

(b) Manufacturing Method

Figure 1:
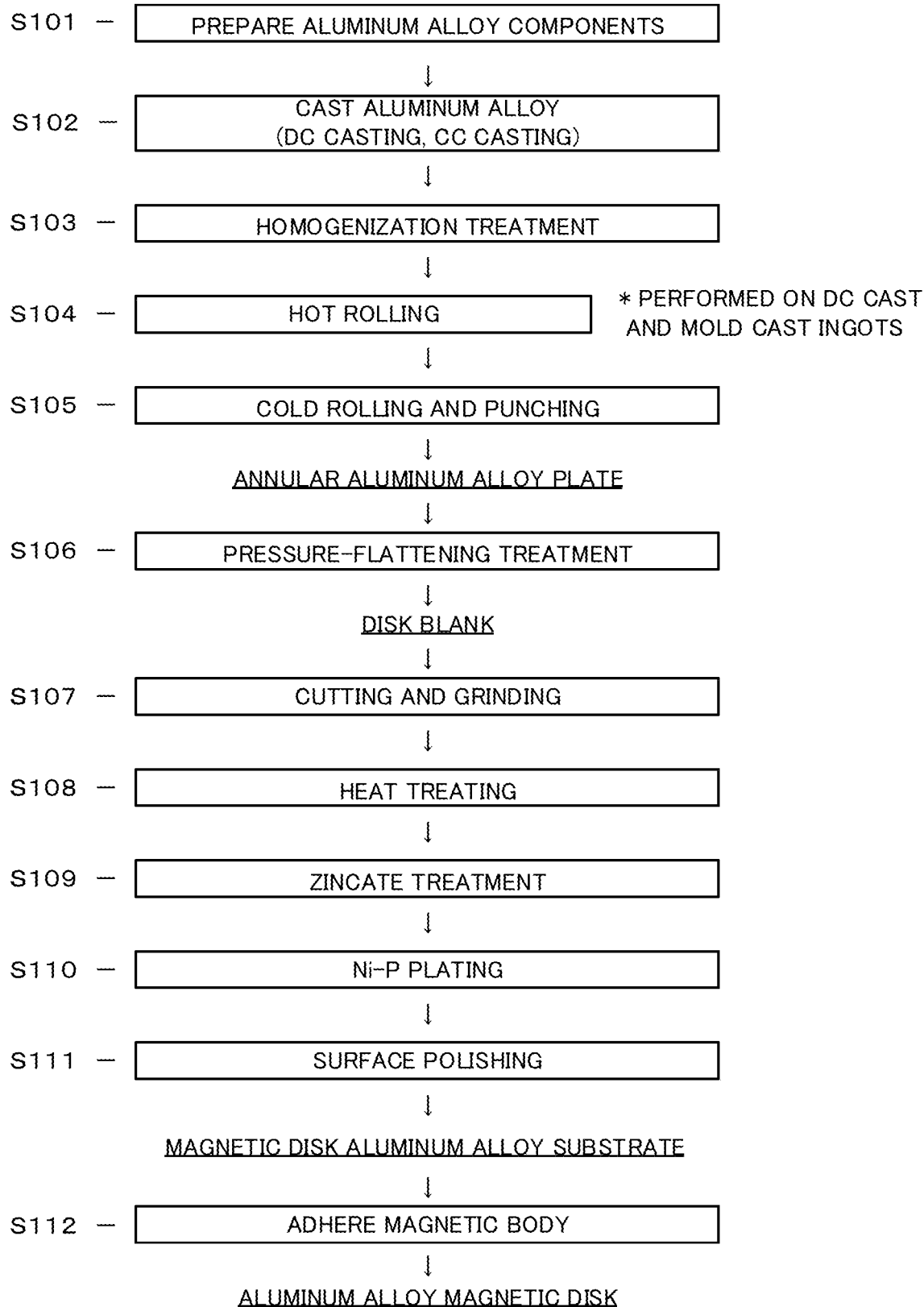
FIG. 1 is a flowchart illustrating a manufacturing method for an aluminum alloy substrate as the magnetic disk substrate according to the present disclosure.

In the following, the various steps and process conditions of a manufacturing method for the magnetic disk aluminum alloy substrate according to the present embodiment are described in detail. FIG. 1 is a flowchart for explaining a manufacturing method for the magnetic disk aluminum alloy substrate according to the present embodiment and for a magnetic disk using the magnetic disk aluminum alloy substrate. In FIG. 1, an aluminum alloy preparation step (step S101) to a cold rolling and punching step (step S105) are steps for manufacturing an aluminum alloy material by melting and casting, making the aluminum alloy material into an aluminum alloy plate, and machining the aluminum alloy plate into an annular shape. Then, in a pressure-flattening step (step S106), an aluminum alloy disk blank is manufactured. Furthermore, the manufactured disk blank is subjected to preprocessing including cutting and grinding (step S107) and heat treating (step S108) and, then, a zincate treatment (step S109), Ni—P plating (step S110), and surface polishing (step S111) are carried out. Thus, a magnetic disk aluminum alloy substrate is manufactured. The surface polished (step S111) magnetic disk aluminum alloy substrate is subjected to a magnetic body adhering step (step S112). Thus, a magnetic disk is manufactured. The content of each step is described below in detail in accordance with the flow illustrated in FIG. 1. Note that the substrate after the cutting and grinding (step S107) may be used as the magnetic disk aluminum alloy substrate. By omitting the Ni—P plating, the constraints related to the plating are eliminated, and the f can be enhanced.

Firstly, molten aluminum alloy material having the composition described above is prepared by heating and melting according to conventional methods (step S101). Next, the prepared molten aluminum alloy material is cast by a semi-continuous casting (DC casting) method, a mold casting method, a continuous casting (CC casting) method, or the like to cast the aluminum alloy material (step S102). Manufacturing conditions and the like of the aluminum alloy material in the DC casting method and the CC casting method are as described below.

In the DC casting method, molten metal poured through a spout is deprived of heat and solidified by a bottom block, walls of a water-cooled mold, and by cooling water discharged directly onto an outer periphery of the ingot (ingot); and is drawn downward as an ingot of the aluminum alloy. In the mold casting method, molten metal poured into a hollow mold formed from cast iron or the like is deprived of heat by the walls of the mold and solidifies, thus forming an ingot.

Meanwhile, in the CC casting method, the molten metal is supplied between a pair of rolls (or belt casters or block casters) through a casting nozzle, and a thin plate of aluminum alloy is cast directly as a result of heat removal by the rolls.

A significant difference between the DC casting method and the CC casting method is the cooling rate when casting. The CC casting method, which has a high cooling rate, is characterized in that the size of the second phase particles is smaller than in DC casting. The cooling rate of the mold casting method tends to be faster than in the DC casting method. In all of the casting methods, it is preferable that the cooling rate when casting is 0.1° C./s or faster. The solid solution amounts of the Fe and the like increase, and the f is increased as a result of setting the cooling rate when casting to 0.1° C./s or faster. When the cooling rate when casting is less than 0.1° C./s, the solid solution amounts of the Fe and the like may decrease, and the f may decrease.

As necessary, the aluminum alloy ingot is subjected to a homogenization treatment (step S103). When performing the homogenization treatment, it is preferable that heat treating at 280 to 420° C. or 500 to 620° C. is performed for 0.5 to 30 hours, and it is more preferable that heat treating at 300 to 350° C. or 510 to 600° C. is performed for 1 to 24 hours In a case in which a heating temperature when performing the homogenization treatment is less than 280° C. or a heating time is less than 0.5 hours, the homogenization treatment will be insufficient, and variation of the f for every aluminum alloy substrate may increase. In a case in which the heating temperature when performing the homogenization treatment exceeds 420° C. and is less than 500° C., the solid solution amounts of the Fe and the like may decrease, and the f may decrease. When the heating temperature when performing the homogenization treatment exceeds 620° C., the aluminum alloy ingot may melt. Even if the heating time of the homogenization treatment is extended beyond 30 hours, the effects thereof saturate, and further remarkable improvement effects cannot be obtained.

Next, the aluminum alloy ingot (DC cast, mold cast) which has been subjected, as needed, to the homogenization treatment or, alternatively, has not been subjected to the homogenization treatment, is hot rolled to obtain a plate material (step S104). When hot rolling, the conditions thereof are not particularly limited, but it is preferable that a hot rolling starting temperature is from 300 to 420° C. or from 500 to 600° C., and it is preferable that a hot rolling ending temperature is from 230 to 400° C.

Next, the hot rolled rolled plate or the cast plate cast by the CC casting method is cold rolled to obtain, from 1.3 mm, a roughly 0.45 mm cold rolled plate (step S105). The cold rolled plate is finished by cold rolling to a product having the desired plate thickness. The conditions of the cold rolling are not particularly limited. It is sufficient that the conditions be set in accordance with the required product plate strength and plate thickness, and it is preferable that a rolling ratio is set to 10 to 95%. Prior to the cold rolling or, alternatively, during the cold rolling, an annealing treatment may be performed to ensure cold rolling workability. When performing the annealing treatment, it is preferable that, in the case of batch heating, the annealing treatment is carried out at 300 to 420° C. for 0.1 to 10 hours and, in the case of continuous heating, the annealing treatment is carried out by holding at 500 to 600° C. for 0 to 60 seconds. Here, the holding time of 0 seconds means cooling immediately after the desired holding temperature is reached.

Then, the aluminum alloy plate obtained by the cold rolling is punched in an annular shape (step S105) to obtain an annular aluminum alloy plate. The annular aluminum alloy plate is formed into a disk blank by a pressure-flattening treatment (step S106). In the pressure-flattening treatment, in one example, pressure-annealing is performed for 0.5 to 10 hours at 200 to 420° C. to fabricate a flattened blank.

Prior to the zincate treatment and the like, the disk blank is subjected to preprocessing including cutting and grinding (step S107) and heat treating (step S108). In one example, in the heat treating, a range of from 130 to 280° C. is held for 0.5 to 10.0 hours. Due to this heat treating it is possible to suppress the reduction of dislocations and enhance fluttering characteristics and the impact resistance. The dislocations decrease when the heat treating temperature exceeds 280° C. or when the heat treating time exceeds 10.0 hours, and, as a result, the fluttering characteristics and the impact resistance may decrease. Meanwhile, removal of the strain introduced by machining becomes insufficient when the heat treating temperature is less than 130° C. or when the heat treating time is less than 0.5 hours, and, as a result, the flatness of the substrate may deteriorate due to changes over time, thus making it difficult to use the substrate as the magnetic disk aluminum alloy substrate. For these reasons, it is preferable that the heat treating of the cut and ground blank is performed by holding in the range of 130 to 280° C. for 0.5 to 10.0 hours.

Note that, to adjust the weight of the substrate, the grinding tolerances of the inner circumference and the outer circumference of the substrate may be appropriately changed.

Next, the disk blank surface is subjected to degreasing, etching, and a zincate treatment (Zn replacement treatment) (step S109). In the zincate treatment, a zincate film is formed on the disk blank surface. In the zincate treatment, a commercially available zincate treatment liquid can be used, and it is preferable that the treatment be carried out under the conditions of a temperature of 10 to 35° C., a treating time of 0.1 to 5 minutes, and a concentration of 100 to 500 mL/L. The zincate treatment is carried out at least one time, and may be carried out two or more times. By carrying out the zincate treatment a plurality of times, fine Zn can be deposited and a uniform zincate film can be formed. When carrying out the zincate treatment two or more times, a Zn stripping treatment may be performed between the zincate treatments. In the Zn stripping treatment, HNO3 is used, and it is preferable that the treatment be carried out under the conditions of a temperature of 15 to 40° C., a treatment time of 10 to 120 seconds, and a concentration of 10 to 60%. Additionally, it is preferable that the second and subsequent zincate treatments by carried out under the same conditions as in the first zincate treatment.

Furthermore, the zincate treated disk blank surface is subjected to electroless Ni—P plating as a base treatment for adhering the magnetic body (step S110). In the electroless Ni—P plating step, a commercially available plating solution or the like is used, and it is preferable that the plating is carried out under the conditions of a temperature of 80 to 95° C., a treatment time of 30 to 180 minutes, and a Ni concentration of 3 to 10 g/L.

When the thickness of the Ni—P plating film is increased, the ρ tends to increase, and the impact resistance can be enhanced. As such, the thickness of the Ni—P plating film preferably is 7 μm or greater, and more preferably is 18 μm or greater.

The plating surface after the electroless Ni—P plating is subjected to surface polishing for the purpose of flattening. (step S111). In this polishing step, it is preferable that the polishing be carried out in a plurality of stages in which the diameter of the polishing grains is adjusted. For example, a main surface is roughly polished using a polishing solution containing large-diameter polishing grains having a grain size of 0.1 to 1.0 μm, and a hard or soft polishing pad. Next, finishing fine polishing of the surface is carried out using a polishing solution containing small-diameter polishing grains having a grain size of 0.01 to 0.1 μm, and a soft polishing pad. The magnetic disk aluminum alloy substrate is manufactured by the steps described above. Note that, from the perspectives of energy conservation and impact resistance, the substrate after the cutting and grinding (step S107) may be used as the magnetic disk aluminum alloy substrate.

1-3-2. Magnetic Disk Glass Substrate

The magnetic disk substrate according to the present disclosure can be constituted from a glass material. In the following, for the magnetic disk glass substrate according to the present disclosure, a glass material and a manufacturing method of a substrate to be applied are each described in detail.

Glass Material

Glass including $SiO_2$: 55 to 75% as a main component, and to which $Al_2O_3$: 0.3 to 25% and CaO: 0 to 20% are added is preferable as the glass used in the magnetic disk substrate. Furthermore, glass to which one type or two or more types of $Li_2O$: 0.01 to 6%, $Na_2O$: 0.7 to 12%, $K_2O$: 0 to 8%, MgO: 0 to 7%, $ZrO_2$: 0 to 10% and $TiO_2$: 0 to 1% is added is preferable.

The $SiO_2$ content being from 55 to 75% leads to an effect of increasing the f of the glass substrate. The $SiO_2$ content in the glass is preferably in the range of 55 to 75%, and more preferably is from 60 to 75%. The $Al_2O_3$ content being from 0.3 to 25% leads to an effect of increasing the ρ of the glass substrate. The $Al_2O_3$ content in the glass is preferably in the range of 0.3 to 25%, and more preferably is from 1.0 to 25%. The CaO content being from 0 to 20% leads to an effect of increasing the f and the ρ of the glass substrate. The CaO content in the glass is preferably in the range of 0 to 20%, and more preferably is from 1 to 20%.

Note that the glass may include $B_2O_3$ (included in aluminoborosilicate glass and borosilicate glass as an essential component), which reduces viscosity and increases solubility and clarity; SrO and BaO, which reduce high-temperature viscosity, improve dissolution, clarity, and moldability, and have the effect of improving Young's modulus; ZnO, which improves ion exchange performance and reduces high-temperature viscosity without reducing low-temperature viscosity; $SnO_2$, which improves clarity and ion exchange performance; $Fe_2O_3$ which is a coloring agent; and $As_2O_3$ and $Sb_2O_3$ as clarifying agents. Additionally, the glass may include, as trace elements, oxides of La, P, Ce, Sb, Hf, Rb, Y, and the like. The content of each of these components may be 15% or less.

(c) Manufacturing Method

Figure 2:
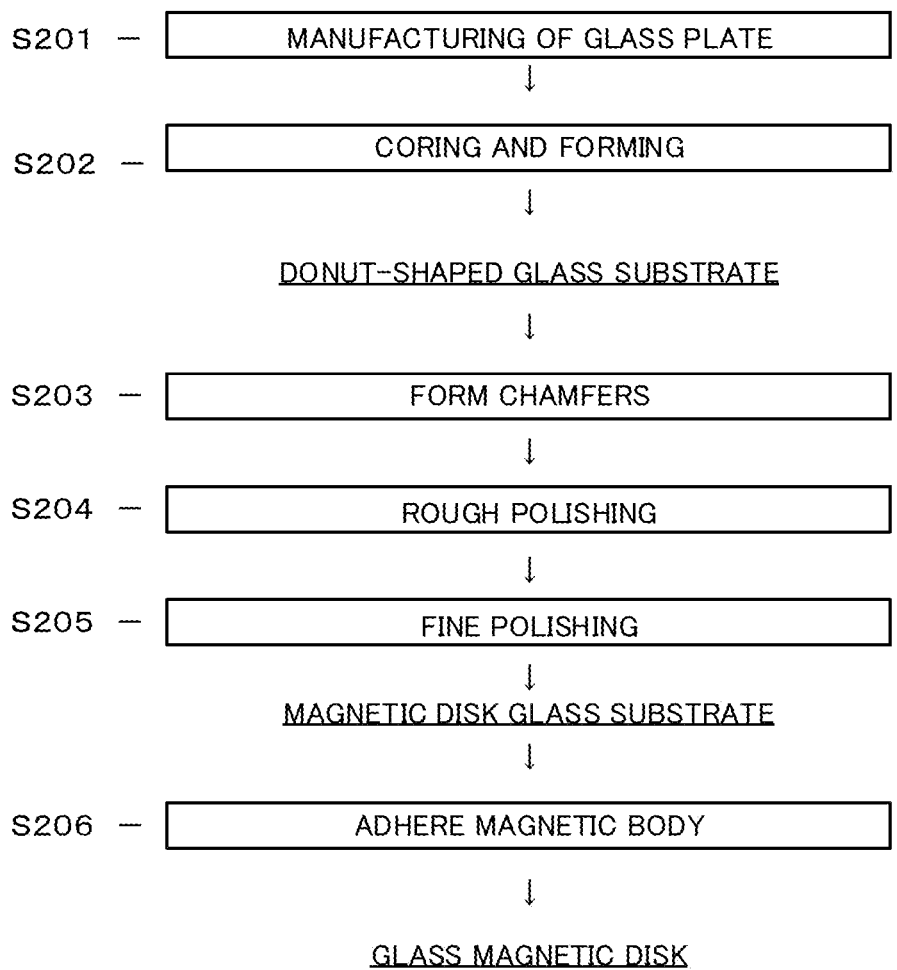
FIG. 2 is a flowchart illustrating a manufacturing method for a glass substrate as the magnetic disk substrate according to the present disclosure.

Next, an example of the manufacturing method for the magnetic disk glass substrate according to the present embodiment is described. FIG. 2 is a flowchart illustrating an example of the manufacturing method for the magnetic disk glass substrate according to the present embodiment, and for a magnetic disk using the magnetic disk glass substrate.

Firstly, a glass plate that serves as a starting material is manufactured (step S201). Next, the glass plate manufactured in step S201 is cored and shaped to shape a donut-shaped glass substrate from the glass plate (step S202).

Next, a chamfered surface is formed on the inner and outer circumferential end surfaces of the molded glass substrate (step S203). The inner and outer circumferential end surfaces of the glass substrate on which the chamfered surfaces are formed are polished and, then, surface polishing is performed. This polishing step consists of rough polishing (step S204), and fine polishing (step S205). In the rough polishing step (step S204), a main surface is roughly polished using a polishing solution containing large-diameter polishing grains having a grain size of 0.1 to 1.0 µm, and a hard or soft polishing pad. In the subsequent fine polishing step (step S205), the roughly polished main surface of the glass substrate is further fine polished using a polishing solution containing small-diameter polishing grains having a grain size of 0.01 to 0.1 µm, and a soft polishing pad. The magnetic disk glass substrate according to the present disclosure is manufactured by the steps described above. Note that, to adjust the weight of the substrate, the polishing tolerances may be appropriately changed when polishing the inner and outer circumferential end surfaces.

Next, a specific description is given for each step. Firstly, regarding the manufacturing of the glass plate of step S201, a known manufacturing method such as a float method, a down draw method, and a direct press method, in which molten glass is the starting material, can be used. It is preferable that a redraw method is used because it is relatively easy to manufacture a glass plate having little variation in thickness. In such a redraw method, a base glass plate manufactured using the float method or the like is heated to soften, and stretched to a desired thickness.

Glass-ceramics such as amorphous glass and crystallized glass can be used as the material of the glass plate. From the perspectives of moldability, workability, and the surface roughness of the product, it is preferable that amorphous glass be used and, for example, it is preferable that aluminosilicate glass, soda lime glass, soda aluminosilicate glass, aluminoborosilicate glass, borosilicate glass, or the like is used. Note that, during the polishing step, a chemical strengthening treatment using a sodium nitrate solution or a potassium nitrate solution may be carried out.

Next, regarding the coring and shaping of the donut-shaped glass substrate of step S202, an annular glass substrate is shaped from the glass plate, prepared in step S201, by the coring step and the inner and outer circumferential end surface polishing step. The shaped glass substrate is an annular glass substrate that has two main surfaces, and a round hole is formed at a center section thereof. Furthermore, the chamfered surface forming of step S203 is carried out.

Next, the rough polishing step of step S204 is carried out using a commercially available batch-type double-sided simultaneous polishing machine. The double-sided simultaneous polishing machine includes upper surface plates and lower surface plates made from cast iron, a carrier that holds a plurality of glass plates between the upper surface plates and the lower surface plates, and polishing pads that are attached to the contact surfaces of the upper surface plates and the lower surface plates with the glass substrates. Here, the polishing pads are made from hard polyurethane or the like. Note that, here, the term "hard" refers to a hardness (Asker C) of 85 or greater as measured by the measuring method defined in the standards of The Society of Rubber Science and Technology, Japan (applicable standard: SRIS0101).

The carrier of the double-sided simultaneous polishing machine holds the plurality of glass plates between the upper surface plates and the lower surface plates, and the upper surface plates and the lower surface plates clamp each of the glass substrates with a predetermined machining pressure. As a result, each of the glass substrates is clamped by polishing pads from above and below at the same time. Next, the upper surface plates and the lower surface plates are rotated in mutually different directions while supplying a predetermined amount of the polishing solution between the polishing pads and each of the glass substrates. As a result, the glass substrates slide on the surfaces of the polishing pads, and both surfaces are simultaneously polished. Note that it is preferable that a solution containing polishing grains made of cerium oxide having a grain size of 0.1 to 1.0 µm is used as the polishing solution.

Next, the step of fine polishing of step S205 is described. In this step, the polishing pads of the double-sided simultaneous polishing machine are replaced with fine polishing soft polishing pads made from foamed urethane, for example, and these polishing pads are used to polish the glass substrates while supplying a polishing solution containing small polishing grains made of colloidal silica having a grain size of 0.01 to 0.10 Note that, here, the term "soft" means a hardness of 60 to 80. Thus, the main surfaces of the glass substrates are mirror polished, and the magnetic disk glass substrate is manufactured.

In the polishing and the like, when shaving down the surface, it is preferable that 30% or more, and more preferable that 40% or more of the thickness per side is shaved. As a result, a large residual stress is generated on each glass substrate surface, and the f can be enhanced. For example, in a glass plate having a thickness prior to polishing of 5 mm, it is preferable that 1.5 mm or more, and more preferable that 2 mm or more of the thickness per side is shaved. While an upper limit is not particularly specified, since productivity decreases when the amount of shaving is excessively great, the upper limit is set to about 45% of the thickness per side.

2. Magnetic Disk 2-1. Aluminum Alloy

A magnetic body is adhered to the magnetic disk aluminum alloy substrate by sputtering (step S112). As a result, an aluminum alloy magnetic disk is manufactured.

2-2. Glass

A magnetic body is adhered to the polished surfaces of the magnetic disk glass substrate by sputtering (step S206). As a result, a glass magnetic disk is manufactured.

3. Magnetic Disk Device

Ten or more of the aluminum alloy magnetic disks fabricated as described above are mounted in a housing to manufacture a magnetic disk device in which the aluminum alloy magnetic disks are mounted. Additionally, ten or more of the glass magnetic disks fabricated as described above are mounted in a housing to manufacture a magnetic disk device in which the glass magnetic disks are mounted.

Note that the number of magnetic disks mounted in the magnetic disk device is set to ten or more, is preferably set to 11, and is more preferably set to 12. Although an upper limit of the number of disks is not particularly limited, when the number of disks is excessive, it is not possible to mount all of the disks. As such, it is preferable that the upper limit of the number of disks be set to about 12.

EXAMPLES

In the following, the present disclosure is described in further detail using examples, but the present disclosure is not limited to these examples. In the examples, pluralities of the aluminum alloy substrate and the glass substrate are used as the magnetic disk substrate, and the characteristics thereof were evaluated.

A. Manufacturing of Magnetic Disk Aluminum Alloy Substrate

Firstly, the various alloy materials illustrated in Nos. 1 to 8 of Table 1 were melted according to conventional methods, and the aluminum alloy compositions were adjusted to obtain molten aluminum alloys (step S101).

S104). The obtained hot rolled plates or the CC cast ingot were cold rolled to fabricate aluminum alloy plates having a thickness of 1 mm or less. These aluminum alloy plates were punched in an annular shape having an outer diameter of 98 mm and an inner diameter of 24 mm. Thus, annular aluminum alloy plates were fabricated (step S105).

The annular aluminum alloy plates fabricated in this manner were pressure-annealed (pressure-flattening treated) for three hours at the temperatures illustrated in Table 2-1 and Table 2-2 to obtain disk blanks (step S106). Next, each of the disk blanks was subjected to end surfacing (cutting) to set to the outer diameter to 97 mm and the inner diameter to 25 mm and, furthermore, grinding was performed (step

TABLE 1

| | No. | ALLOY COMPOSITION (MASS %) | | | | | | | | | |
|---|---|---|---|---|---|---|---|---|---|---|---|
| | | Fe | Mn | Ni | Mg | Zn | Cu | Cr | Zr | Be | Si |
| EXAMPLE | 1 | 0.02 | 0.00 | 0.00 | 4.00 | 0.31 | 0.02 | 0.05 | 0.00 | 0.0002 | 0.02 |
| | 2 | 0.74 | 1.00 | 1.85 | 0.00 | 0.32 | 0.01 | 0.00 | 0.00 | 0.0000 | 0.06 |
| | 3 | 0.71 | 0.99 | 1.77 | 0.00 | 0.31 | 0.02 | 0.00 | 0.00 | 0.0000 | 0.05 |
| | 4 | 1.65 | 0.35 | 0.01 | 0.00 | 0.33 | 0.02 | 0.00 | 0.00 | 0.0000 | 0.06 |
| | 5 | 8.00 | 0.00 | 0.00 | 0.00 | 0.33 | 0.02 | 0.00 | 0.00 | 0.0000 | 0.06 |
| | 6 | 0.64 | 0.33 | 1.74 | 1.51 | 0.33 | 0.02 | 0.00 | 0.01 | 0.0000 | 0.06 |
| | 7 | 0.97 | 0.94 | 1.25 | 0.00 | 0.35 | 0.01 | 0.00 | 0.00 | 0.0000 | 0.08 |
| COMPARATIVE EXAMPLE | 8 | 0.02 | 0.00 | 0.00 | 4.00 | 0.34 | 0.02 | 0.05 | 0.00 | 0.0015 | 0.02 |

Next, the molten aluminum alloys were cast under the conditions illustrated in Table 2-1 and Table 2-2, and ingots having the thicknesses illustrated in Table 2-1 and Table 2-2 were fabricated (step S102). Next, the surfaces of the ingots, except for No. 7, were surface ground to remove segregation layers existing on the surfaces of the ingots.

Table 2-1 and Table 2-2

TABLE 2-1

| | No. | CASTING METHOD | PLATE THICKNESS AFTER CASTING (mm) | HOMOGENIZATION TREATMENT TEMPERATURE (° C.) | HOMOGENIZATION TREATMENT TIME (h) | HOT ROLLING STARTING TEMPERATURE (° C.) | HOT ROLLING ENDING TEMPERATURE (° C.) | PLATE THICKNESS AFTER HOT ROLLING (mm) |
|---|---|---|---|---|---|---|---|---|
| EXAMPLE | 1 | DC | 500 | 540 | 4 | 420 | 350 | 3 |
| | 2 | CASTING METHOD | 60 | 320 | 2 | 320 | 280 | 3 |
| | 3 | CASTING METHOD | 60 | 320 | 2 | 320 | 280 | 3 |
| | 4 | CASTING METHOD | 60 | 320 | 2 | 320 | 280 | 3 |
| | 5 | CASTING METHOD | 10 | 550 | 2 | 550 | 280 | 3 |
| | 6 | DC | 500 | 600 | 3 | 580 | 350 | 3 |
| | 7 | CC | 6 | 400 | 3 | — | — | — |
| COMPARATIVE EXAMPLE | 8 | DC | 500 | 540 | 4 | 450 | 350 | 3 |

TABLE 2-2

| | No. | COLD ROLLING RATE (%) | PRESSURE-ANNEALING TEMPERATURE (° C.) | SINGLE SIDE PLATING THICKNESS (μm) | ρ (g/cm³) | f (Hz) | f × ρ/t (Hz · g)/(cm³ · mm) | WEIGHT OF ONE SUBSTRATE HAVING PLATE THICKNESS OF 0.5 MM (g) |
|---|---|---|---|---|---|---|---|---|
| EXAMPLE | 1 | 75 | 320 | 5 | 2.74 | 720 | 3940 | 9.6 |
| | 2 | 75 | 320 | 0 | 2.75 | 1136 | 4222 | 9.5 |
| | 3 | 75 | 320 | 0 | 2.72 | 1099 | 4045 | 10.1 |
| | 4 | 75 | 320 | 0 | 2.78 | 1134 | 4261 | 10.3 |
| | 5 | 72 | 320 | 0 | 2.83 | 1276 | 4245 | 10.4 |
| | 6 | 79 | 320 | 0 | 2.72 | 1103 | 4054 | 10.1 |
| | 7 | 88 | 320 | 30 | 3.44 | 740 | 5091 | 11.5 |
| COMPARATIVE EXAMPLE | 8 | 75 | 400 | 0 | 2.60 | 1082 | 3748 | 9.6 |

Next, the ingots were subjected to homogenization treatment under the conditions illustrated in Table 2-1 and Table 2-2 (step S103). Then, with the exception of No. 7, the ingots were hot rolled to fabricate hot rolled plates (step S107). With the exception of No. 1 and No. 7, the processing was ended at this stage. The disk blanks of No. 1 and No. 7 were further subjected to heat treating at 300° C. for 0.5 hours (step S108). Then, degreasing was carried out at 60° C. for five minutes using an AD-68F (product name, manufactured by C. Uyemura & Co., Ltd.), then acid etching was carried out at 65° C. for one minute using an AD-107F (product name, manufactured by C. Uyemura & Co., Ltd.), and then desmutting was carried out for 20 seconds using a 30% $HNO_3$ aqueous solution (at room temperature).

After preparing the surface state as described above, the disk blanks were subjected to zincate treatment by immersing the disk blanks for 0.5 minutes in a 20° C. zincate treatment liquid, namely AD-301F-3X (product name, manufactured by C. Uyemura & Co., Ltd.) (step S109). Note that, for the zincate treatment, the same treatment was carried out a total of two times and, between the first and the second zincate treatment, the surface stripping treatment was carried out by immersing the disk blanks for 20 seconds in a room temperature 30% HNO3 aqueous solution. Next, the zincate treated surface was subjected to Ni—P electroless plating using an electroless Ni—P plating solution (NIMUDEN HDX, manufactured by C. Uyemura & Co., Ltd.) at about 90° C., such that the plating thickness was as illustrated in FIG. 2 (step S110).

Furthermore, the resulting plating surface was roughly polished using an alumina slurry having an average grain size of 800 nm and a foamed urethane polishing pad. A machining amount of the rough polishing was 0.2 μm thickness per side. Next, finishing fine polishing (polishing) was performed using colloidal silica and a foamed urethane polishing pad (step S111). Note that, in the polishing, a thickness per side of 0.1 μm was polished using the foamed urethane polishing pad and a polishing solution of free abrasive grains obtained by adding water to colloidal silica having a grain size of 70 to 90 nm and an average grain size of 80 nm. Thus, only for Nos. 1 and 7, magnetic disk aluminum alloy substrates (outer diameter: 97 mm, inner diameter: 25 mm, plate thickness: 0.5 mm) were fabricated in which a Ni—P plating layer was provided and surface polished. The substrates fabricated as described above were used as weight measurement samples.

Meanwhile, for the examples other than No. 1 and 7, the disk blanks, pressure-flattened in step S106, were subjected to edge surfacing (cutting) and grinding to fabricate magnetic disk aluminum alloy substrates (outer diameter 97 mm, inner diameter: 25 mm, plate thickness: 0.5 mm) that are not provided with the Ni—P plating layer. The substrates fabricated as described above were used as weight measurement samples.

B. Magnetic Disk Glass Substrate

Glass plates were fabricated using the various compositions illustrated in Nos. 9 to 12 of Table 3, and by the methods illustrated in Table 4. Note that the plate thickness was set to 5 mm for No. 10, and the plate thickness was set to 1 mm or less for Nos. 9, 11, and 12. In No. 10, the surface was shaved 4.2 mm (2.1 mm per side) to set the thickness to 1 mm or less (step S201).

TABLE 3

| | No. | COMPONENT COMPOSITION (MASS%) | | | | | | | | | |
|---|---|---|---|---|---|---|---|---|---|---|---|
| | | $SiO_2$ | $Al_2O_3$ | $B_2O_3$ | $Na_2O$ | $K_2O$ | MgO | CaO | BaO | $SnO_2$ | $Fe_2O_3$ |
| EXAMPLE | 9 | 61.3 | 16.0 | 8.2 | — | — | 2.8 | 7.9 | 3.4 | 0.4 | — |
| | 10 | 66.0 | 14.2 | — | 4.0 | — | 6.5 | 9.0 | — | 0.3 | — |
| | 11 | 71.0-73.0 | 0.5-1.5 | — | 13.0-15.0 | — | 1.5-3.5 | 8.0-10.0 | — | — | 0.1-0.2 |
| COMPARATIVE EXAMPLE | 12 | 81.0 | 2.0 | 13.0 | 3.0 | 1.0 | — | — | — | — | — |

TABLE 4

| | No. | GLASS PLATE MANUFACTURING METHOD | SURFACE POLISHING AMOUNT (MM) AFTER FABRICATING GLASS PLATE (mm) | ρ (g/cm³) | f (Hz) | f × ρ/t (Hz · g)/ (cm³ · mm) | WEIGHT OF ONE SUBSTRATE HAVING PLATE THICKNESS OF 0.5 MM (g) |
|---|---|---|---|---|---|---|---|
| EXAMPLE | 9 | FLOAT METHOD | 0.0 | 2.46 | 1090 | 3827 | 8.5 |
| | 10 | FLOAT METHOD | 4.2 | 2.47 | 1359 | 4039 | 8.5 |
| | 11 | REDRAW METHOD | 0.0 | 2.46 | 1010 | 3807 | 8.5 |
| COMPARATIVE EXAMPLE | 12 | REDRAW METHOD | 0.0 | 2.20 | 603 | 3233 | 7.6 |

The glass plates having a plate thickness of 1 mm or less manufactured in the manner described above were cored and shaped into donut-shaped glass substrates. Furthermore, chamfer surfaces were formed on the inner and outer circumferences. Thus, glass substrates for which the outer diameter is 97 mm and the inner diameter of the round hole is 25 mm were manufactured (steps S202 and S203).

Next, these glass substrates were subjected to the rough polishing (step S204) and the fine polishing (step S205) in accordance with the manufacturing method described above, using the double-sided simultaneous polishing machine.

Here, in the rough polishing step (step S204), both sides of the glass substrates having the characteristics described above were rough polished using a urethane polishing pad and a polishing solution of free abrasive grains obtained adding water to cerium oxide polishing grains having a grain size of 0.1 to 0.4 μm and an average grain size of 0.19 μm.

In the subsequent fine polishing step (step S205), the rough-polished glass substrates were fine-polished a thickness per side of 1 μm using a foamed urethane polishing pad and a polishing solution of free abrasive grains obtained adding water to colloidal silica having a grain size of 70 to 90 nm and an average grain size of 80 nm. Thus, magnetic disk glass substrates (outer diameter: 97 mm, inner diameter: 25 mm, plate thickness: 0.5 mm) were fabricated and used as weight measurement samples.

C. Evaluation of Characteristics of Manufactured Magnetic Disk Substrates

The weight and the (f×ρ/t) of the disk blanks after step S106, the aluminum alloy substrates after step S110, and the glass plates after step S201 were evaluated in accordance with the following methods. Note that the aluminum alloy magnetic disk after step S112 and the glass magnetic disk after step S206 can also be used to evaluate the weight and the (f×ρ/t.)

(f×ρ/t)

The following is related to the (f×ρ/t) as defined in claims 1, 3, 6, and 7. A 60 mm×8 mm sample was extracted and the resonance frequency was measured by the resonance method. Additionally, the size (length, width, thickness) and the weight of another sample were measured and the density was calculated. Then, the (f×ρ/t) was calculated on the basis of the thickness of the substrate. Note that the measuring of the resonance frequency was carried out at room temperature using a JE-RT type measuring device manufactured by Nihon Techno-Plus Co. Ltd. Note that, when measuring transparent glass, carbon spray is sprayed until continuity is established and then the measuring is performed. Provided that the thickness of the carbon film is about 1 μm, no problems are caused.

Weight

The following is related to the weight as defined in claims 8 to 10. The weight of each of the magnetic disk substrates (outer diameter: 97 mm, inner diameter of round hole: 25 mm) having a plate thickness of 0.5 mm is measured using an electronic balance. Note that the weight can also be calculated from the density of each material and the plating density.

Tables 2 and 4 illustrate the results of evaluating the various characteristics of the magnetic disk substrates manufactured in the examples.

As illustrated in FIGS. 2 and 4, the predetermined (f×ρ/t) was obtained in each of Examples 1 to 7 and 9 to 11.

In contrast, as illustrated in FIGS. 2 and 4, the (f×ρ/t) of the substrates in Comparative Examples 8 and 12 was excessively small.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2020-115353, filed on Jul. 3, 2020, the entire disclosure of which is incorporated by reference herein.

INDUSTRIAL APPLICABILITY

According to the present disclosure, a magnetic disk substrate having excellent impact resistance and energy conservation, and a magnetic disk using the magnetic disk substrate can be obtained.

The invention claimed is:

1. A magnetic disk substrate, wherein, when f (Hz) is a resonance frequency, ρ (g/cm$^3$) is a density, and t (mm) is a plate thickness of the magnetic disk substrate, (f×ρ/t) is 3800 or greater, wherein the magnetic disk substrate comprises an aluminum alloy including one or more of Zr: up to 0.20 mass %, Be: up to 0.0015 mass %, Sr: up to 0.1 mass %, Na: up to 0.1 mass %, and P: up to 0.1 mass %, a balance being Al and unavoidable impurities, wherein the resonance frequency is between 500 and 1500 Hz when measured at an impact acceleration of 30 to 50 G.

2. The magnetic disk substrate according to claim 1, wherein the aluminum alloy includes one or more of Fe: 8.5 mass % or less, Mn: 2.5 mass % or less, Ni: 6.5 mass % or less, and Mg: 4.5 mass % or less, wherein the aluminum alloy further includes one or more of Zn: 0.7 mass % or less, Cu: 1.0 mass % or less, and Cr: 0.30 mass % or less.

3. A magnetic disk substrate comprising a glass material including $SiO_2$: 55 to 75 mass % as a main component and to which $Al_2O_3$: 0.3 to 25 mass % and CaO: 0 to 20 mass % are added, wherein when f (Hz) is a resonance frequency, ρ (g/cm$^3$) is a density, and t (mm) is a plate thickness, (f×ρ/t) is 3800 or greater, wherein the glass material further includes one more of $ZrO_2$: up to 10 mass % and $TiO_2$: up to 1 mass %, wherein the resonance frequency is between 500 and 1500 Hz when measured at an impact acceleration of 30 to 50 G.

4. The magnetic disk substrate according to claim 3, wherein the glass material further includes one or more of $Li_2O$: 0.01 to 6 mass %, $Na_2O$: 0.7 to 12 mass %, and $K_2O$: 0 to 8 mass %, MgO: 0 to 7 mass %.

5. The magnetic disk substrate according to claim 3, wherein the glass material further includes one or more of $B_2O_3$, SrO, BaO, ZnO, $SnO_2$, $Fe_2O_3$, $As_2O_3$, and $Sb_2O_3$, respectively at 15 mass % or less.

6. The magnetic disk substrate according to claim 1, wherein the (f×ρ/t) is 4000 or greater.

7. The magnetic disk substrate according to claim 1, wherein the (f×ρ/t) is 4200 or greater.

8. The magnetic disk substrate according to claim 1, wherein a weight per one magnetic disk is from 6.0 to 11.0 g.

9. The magnetic disk substrate according to claim 1, wherein a weight per one magnetic disk is from 6.0 to 10.5 g.

10. The magnetic disk substrate according to claim 1, wherein a weight per one magnetic disk is from 6.0 to 8.7 g.

11. The magnetic disk substrate according to claim 7, wherein a weight per one magnetic disk is from 6.0 to 11.0 g.

12. The magnetic disk substrate according to claim 7, wherein a weight per one magnetic disk is from 6.0 to 8.7 g.

13. A magnetic disk comprising a magnetic body layer on a surface of the magnetic disk substrate according to claim 8.

14. The magnetic disk substrate according to claim 8, wherein the magnetic disk substrate has an outer diameter of 97 mm.

15. A magnetic disk comprising a magnetic body layer on a surface of the magnetic disk substrate according to claim 10.

16. The magnetic disk substrate according to claim 10, wherein the magnetic disk substrate has an outer diameter of 97 mm.

17. A magnetic disk comprising a magnetic body layer on a surface of the magnetic disk substrate according to claim 11.

18. The magnetic disk substrate according to claim 11, wherein the magnetic disk substrate has an outer diameter of 97 mm.

19. A magnetic disk comprising a magnetic body layer on a surface of the magnetic disk substrate according to claim 12.

20. The magnetic disk substrate according to claim 12, wherein the magnetic disk substrate has an outer diameter of 97 mm.

21. The magnetic disk substrate according to claim 13, wherein the magnetic disk substrate has an outer diameter of 97 mm.

22. The magnetic disk substrate according to claim 15, wherein the magnetic disk substrate has an outer diameter of 97 mm.

* * * * *